United States Patent [19]

Järvfält

[11] Patent Number: 4,614,909

[45] Date of Patent: Sep. 30, 1986

[54] APPARATUS FOR IDENTIFYING DIGITAL MULTI-FREQUENCY SIGNALS

[75] Inventor: Staffan Järvfält, Huddinge, Sweden

[73] Assignee: Telefonaktiebolaget LM Ericsson, Stockholm, Sweden

[21] Appl. No.: 558,420

[22] PCT Filed: Mar. 25, 1983

[86] PCT No.: PCT/SE83/00107

§ 371 Date: Nov. 23, 1983

§ 102(e) Date: Nov. 23, 1983

[87] PCT Pub. No.: WO83/03732

PCT Pub. Date: Oct. 27, 1983

[30] Foreign Application Priority Data

Apr. 6, 1982 [SE] Sweden .................. 8202191

[51] Int. Cl.⁴ ............... H04M 1/50; G06F 15/31
[52] U.S. Cl. ..................... 328/140; 340/825.73; 179/84 VF; 364/484; 364/724; 328/152; 455/137
[58] Field of Search .......... 328/140, 138, 152; 307/525; 455/137; 179/84 VF; 364/484, 724; 340/825.73

[56] References Cited

U.S. PATENT DOCUMENTS

| | | | |
|---|---|---|---|
| 3,935,539 | 1/1976 | Linder | 307/525 |
| 4,142,177 | 2/1979 | Davis | 328/140 |
| 4,145,660 | 3/1979 | Allen et al. | 328/138 |
| 4,230,991 | 10/1980 | Paphitis | 328/140 |
| 4,286,221 | 8/1981 | Takaoka | 328/140 |
| 4,328,398 | 5/1982 | Kawaguchi et al. | 179/84 VF |
| 4,368,434 | 1/1983 | Miller et al. | 328/140 |
| 4,399,536 | 8/1983 | Metz | 364/724 |
| 4,479,188 | 10/1984 | De Keijzer | 364/484 |

Primary Examiner—John S. Heyman
Attorney, Agent, or Firm—Roberts, Spiecens & Cohen

[57] ABSTRACT

An apparatus for identifying multi-frequency signals, the received signals being processed in selective receivers after having passed through a digital bandpass filter. The input signal to the receivers is multiplied at sampling times by a coefficient from each of two sets of coefficients. The first set is obtained by multiplying a sine function by a weighting function and the other by multiplying the same sine function phase-shifted $\pi/2$ by the same weighting function. The product of multiplication is formed and squared individually for each one of the multiplications, and the squared results are summed to obtain a measure of the signal energy within the passband. The received signals are subjected to an absolute amount generation and digital filtering in two nonselective receivers the first of which is affected by the changes in the composite input signal level and controls the start of the calculations periods in the selective receivers, and the other generates a signal which is a measure of the envelope amplitude. A circuit forms a sum signal from all selective receivers and a comparison circuit compares the sum signal with a signal obtained by squaring the output signal from the second non-selective receiver. A logical circuit selects the greatest of the selective receivers' signals, a threshold circuit forms a threshold value which is proportional to said greatest signal, and a comparison circuit decides which of the remaining signals that is sufficiently great for indicating together with the greatest signal that a digital multifrequency signal has been received.

3 Claims, 2 Drawing Figures

APPARATUS FOR IDENTIFYING DIGITAL MULTI-FREQUENCY SIGNALS

FIELD OF INVENTION

The invention relates to apparatus for identifying digital multi-frequency signals, the received signals being fed through a group filter to a plurality of selective receivers answering to the discrete frequencies in the expected input signals. The invention relates moreover to apparatus of the above type wherein the input signal to each of said receivers is multiplied by a coefficient from each of two sets, of coefficients, the first set being obtained from multiplying a sine function of the frequency specific to the receiver by a weighting function, the other coefficient being obtained by multiplication of said sine function phase-shifted 90 /2 by the same weighting function, the results of multiplying the input signal by said coefficients being accumulated for both sets each by itself, each of said results being squared, and the squared results summed to obtain a measure of the signal energy within the passband.

BACKGROUND

Circuits which are of the type mentioned, excepting for the group filter, are described in an article by Ivan Koval and Georg Gara: "Digital MF Receiver Using Discrete Fourier Transform" (I.E.E.E. Transaction on Communications, Vol. COM-21, No. 12, December 1973, and is an article by Fritz G Braun: "Nonrecursive Digital Filters for Detecting Multi-Frequency Code Signals" (I.E.E.E. Transactions on Acoustics, Speech and Signal Processing", Vol. ASSP-23, No. 3, June 1973).

The selectivity requirement for multi-frequency code (MFC) receivers according to the CCITT specification for the signal system R2 is to a major extent determined by the requirement that operation for single tone may not occur. For these requirements to be fulfilled merely with the selective receivers, the time interval for calculating the correction must be about 30 ms. If an output decision is based on comparisons of the calculated correlations mutually as well as with some fixed threshold value, the risk is great that a short pulse of single tone or of a MFC signal causes operation if solely a 30 ms. interval is required for approval. Furthermore, the release time will be long if the same set of coefficients and thereby the same time interval is used for detecting release.

In the first of the above mentioned articles, there is proposed as a decision condition that two consecutive calculation intervals shall give identical results (same frequencies are present or there is an absence of signal) which accordingly makes the changeover to operation and release slower. As protection against interference it is proposed that the sum of the two greatest, selectively calculated energies be compared with the difference between the total energy and this sum.

A requirement according to the CCITT R2 specification is that simultaneous signalling in the send direction shall not affect the receiver. Frequencies which are used in signalling in the send direction must therefore be filtered away. If this is achieved with a group filter which is common to the selective receivers, the selectivity requirement for these may be reduced considerably, not only because the effect from signals in the send direction is eliminated at the input to the selective receivers, but also because the previously mentioned measure for protection against noise signals can be employed, since the mean value of the signal after the group filter can be calculated and a variable decision threshold obtained. This threshold is related to the total energy in the signal after the group filter, i.e. within the frequency band for the expected signals in the receive direction.

In an MFC receiver according to the CCITT R2 specification, each calculation interval for the correlations could be reduced to 15 ms. with the aforementioned measure for protection against noise signals, but the release time would still be close to 30 ms. even if only one calculation interval with the absence of signal were to be recognized as release. No indication of whether a short interruption can have disturbed the correlation calculation is obtained, which can result in that a single tone subjected to a short interruption is recognized as the presence of two adjacent MFC frequencies.

SUMMARY OF INVENTION

To eliminate said drawbacks, it is an object of the invention to provide that changes in the input signal to the receiver be monitored which constitute possible indications that a signal is starting or ceasing. Depending on what stage of the signalling the receiver is in, calculation of the correlations is started or time monitoring for release is started. The monitoring is carried out with a non-selective receiver which is zero-set with such a time interval and has such time constants that its output signal at the termination of the interval is a measure, sufficiently accurate for the purpose, of the mean value of the input signal during the time interval.

To achieve the above and other objects of the invention, there is generally provided in accordance with the above and as described in detail hereinafter, an apparatus for identifying digital multi-frequency signals. This apparatus comprises a digital bandpass filter to receive the signals and also includes a plurality of selective receivers. The signals received by the above-mentioned filter are processed in the selective receivers after passing through the digital bandpass filter. The selective receivers include means whereby the input signals forwarded by the filter to the selective receivers are multiplied at sampling times by a coefficient from each of first and second sets of coefficients. The first set is obtained by multiplying a sine function by a weighting function and the second set is obtained by multiplying the same sine function phase shifted by $\pi/2$ by the same weighting function. The selective receivers further include means whereby the products of the multiplications are formed and squared individually for each one of the mulitplications and the squared results are summed to obtain a measure of the signal energy within the passband. Further included in the apparatus are first and second non-selective receivers whereby the signals received by the filter are subjected to an absolute amount generation and digital filtering in the first and second non-selective receivers. The first non-selective receiver is responsive to changes in the composite input signal level and controls the start of calculation periods in the selective receivers. The second non-selective receiver generates a signal which is a measure of envelope amplitude. Also included in the apparatus is a circuit forming a sum signal from all of the selective receivers. There is also employed a comparison circuit comparing the sum signal with a signal obtained by squaring the output signal from the second non-selective receiver. A logical circuit means is included which selects the greatest of the selective receivers' signals and a threshold signal forms a threshold value which is proportional to the greatest signal. Further included is a comparision circuit which determines which of the remaining signals is greater than a determined value for indicating, together with the greater signal, that a digital multi-frequency signal has been received.

BRIEF DESCRIPTION OF DRAWING

The invention will next be described in detail below with the aid of reference to the accompanying drawing in which.

DETAILED DESCRIPTION

Figure 1:
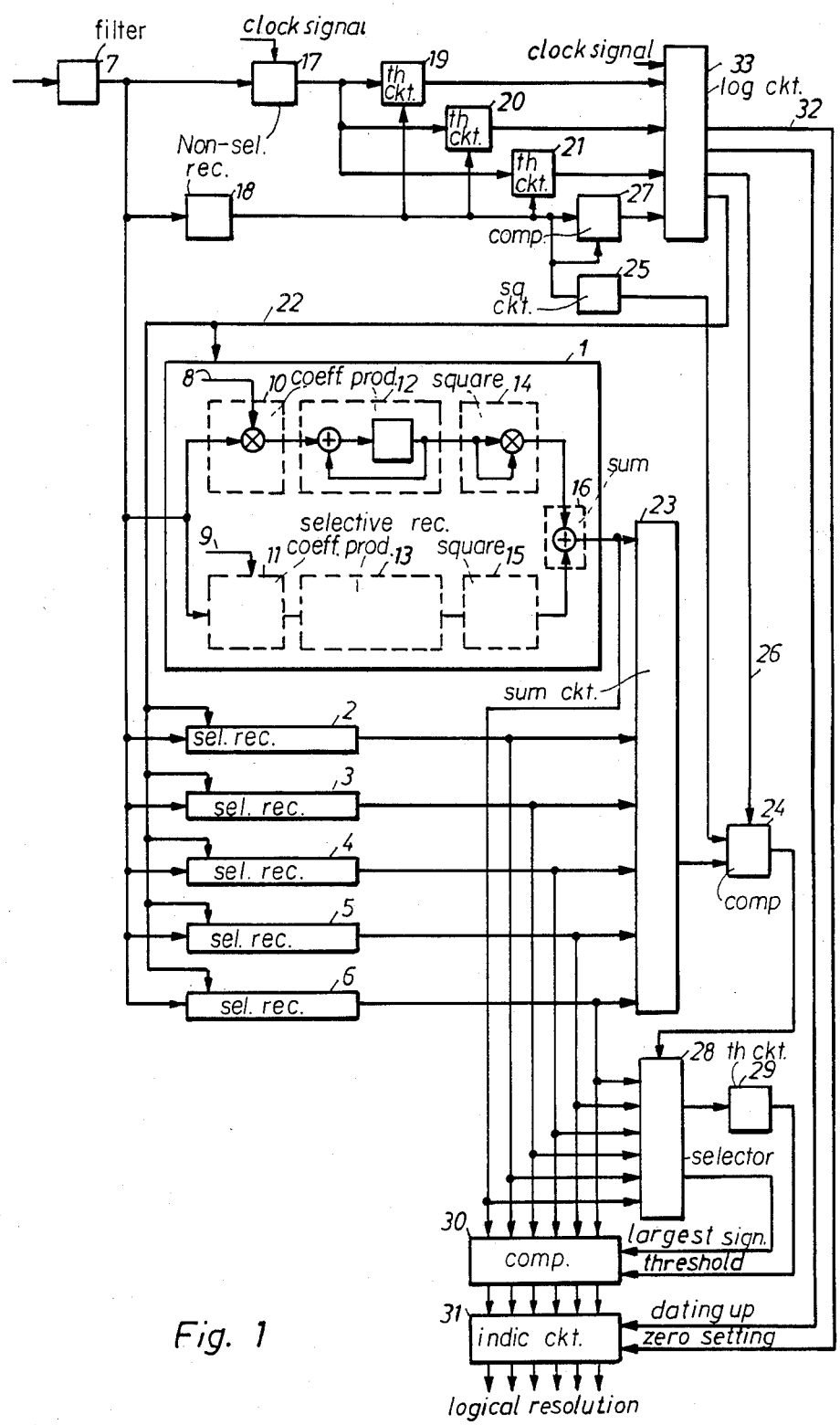
FIG. 1 is a block diagram of a multi-frequency receiver in accordance with the invention.

According to FIG. 1, the multi-frequency receiver of the invention includes a digital group filter 7, which filters away to a sufficient extent all frequencies outside of an intended frequency range. Furthermore, the receiver contains six selective receivers 1–6 and two non-selective receivers 17, 18 for controlling a decision process which generates an output decision this is accomplished on the basis of output signals from both the selective and non-selective receivers and also includes decision as to the times for zero-setting and reading out from these receivers, as will be explained in greater detail below.

The selective receivers, each answering to one of the discrete frequencies in the expected input signals, are of a type known per se. In these receivers, the input signal at each sampling time is multiplied by two coefficients, one from each of a set as indicated by the blocks 10, 11. The first set, symbolized by the input 8 in the selective receiver 1, is obtained by the multiplication of a sine function by a weighting function, and the other set symbolized by the input 9 of the receiver 1 is obtained by multiplication of said sine function, phase shifted $\pi/2$, by the same weighting function. The results of multiplication of the input signal and said coefficients are accumulated for the two sets individually (indicated by the product blocks 12, 13), the contents of the accumulators being individually squared (indicated by the square blocks 14, 15) and the squared results being summed (indicated by the sum block 16). There is accordingly obtained a measure of the signal energy within the passband and according to the Koval article mentioned above, this measure is equal to the squared amount of the discrete Fourier transform (DFT) of the input signal multiplied by the weighting function which determines the receiver selectivity. Such a selective receiver is already known, e.g. through the articles mentioned above. In each of the selective receivers, the DFT is calculated for the discrete frequency to which the set of coefficients corresponds.

In the two non-selective receivers 17, 18 the signal from the group filter is subjected to an absolute amount formation and digital low-pass filtering in a recursive filter of a type known per se, but in which the discharging time constant is suitably greater than the charging time constant. The decision threshold for the selective receivers is a function of the output signals from the non-selective receivers.

The value of the decision threshold for the selective receivers is calculated in the non-selective receiver 18 and the squaring circuit 25, said threshold being a measure of the input signal energy within the frequency band of the expected signals in the receive direction. The time constant of the digital lowpass filter is selected to be a value large enough for the variations of the envelope of an MFC signal to have only a small effect on the decision threshold. It is not greater than that in which the decision threshold can attain a relevant value of the total energy of the signal from the group filter during the extent of the calculation period in the selective receivers.

There is obtained in the described apparatus, for each time interval within which the correlation calculations are carried out in the selective receivers, the discrete Fourier transform of the input signal solely at the expected frequencies of the input signal. With the short calculation interval required for sufficiently rapid identification of signals, the selectivity will be so low that it is hardly worth while also to calculate the DFT for frequencies other than the frequencies halfway between the MFC signals, for the purpose of detecting noise signals. If the input signal is not stationary during a calculation interval, or if it is indeed stationary but contains other frequencies than those expected, the calculated values of the DFT do not give sufficient information about the input signal. The problem in the latter case is solved by the variable decision threshold.

For monitoring the signal from the group filter to see whether it is stationary during the DFT calculation, the apparatus of the invention is provided with a further non-selective receiver 17, which can be used to give a rapid and reliable indication when the signal ceases. The normal change of energy due to the periodic envelope must however not be recognized as though the signal were not steady. If the lowpass filter in the non-selective receiver 17 is zero-set with sufficiently short intervals, short interruptions can be discovered nevertheless. The period of energy in the envelope of an MFC signal is at most 5 ms. while an interruption of up to 7 ms. must not cause an interruption in the output decision information. In tests it has been found that an interval of 4–5 ms. between zero-settings is appropriate. It is also appropriate to allow the interval to be a whole sub-multiple of the interval for calculating the DFT, which is about 16 ms., i.e. 4 for 16 ms. and 5 for 15 ms.

The non-selective receiver 17 is affected by the changes in the composite input signal level and controls the start of the calculating periods in response to these changes, as indicated by the output 22. If the output signal from the group filter (FIG. 2a) exceeds a given threshold (level 1) there is a continued monitoring by the receiver 17 and threshold circuit 19 during continuously repeated 5 ms. intervals, according to the example. This threshold can be fixed or signal-responsive. If a sufficiently long time has passed (FIG. 2b, D) since the next previous, accepted MFG signal has ceased, the fixed threshold is used, if it is sufficiently low for the output signal from the receiver 17 to exceed level 1, even for the weakest acceptable MFC signal. When an accepted MFC signal ceases, some time may elapse until all transients and echoes on the line have faded out.

The level of these noise signals is in relation to the level of the MFC signal. By making the level 1 proportional to the previous MFC signal level by a sufficiently large factor during the time such noise signals may be present, the receiver is prevented from beginning to process these noise signals as though they were a recognizable new MFC signal. To do otherwise would delay the operation for the next correct MFC signal, if it were to come before the noise signals had faded out.

If the signal exceeds level 1 (FIG. 2b, A), this might be an indication that an MFC signal is starting. Accordingly, the calculation of the DFT starts after a further 5 ms., simultaneously as an upper (level 2) threshold in the circuit 20 and a lower (level 3) threshold in the circuit 21, for monitoring whether the signal is stationary, are updated with values proportional to the signal from the non-selective receiver 18. On the other hand, if the signal falls below level 1, the filter is zero-set in the receiver 18 also.

When the calculation of the DFT is started, there is 5 ms interval monitoring for ascertaining that the signal keeps between the two signal-responsive threshold values at level 2 and level 3. If the signal is too weak during a 5 ms. interval, the calculation of the DFT is begun again. If the signal continues to be weak for three further 5 ms. intervals, release is indicated from the logic circuit 33 via the output 32. If the signal instead becomes stronger, so that the upper threshold value is exceeded, the DFT is also calculated anew, and the threshold values at level 2 and level 3 are furthermore updated anew with values proportional to the signal from the receiver 18.

Figure 2:
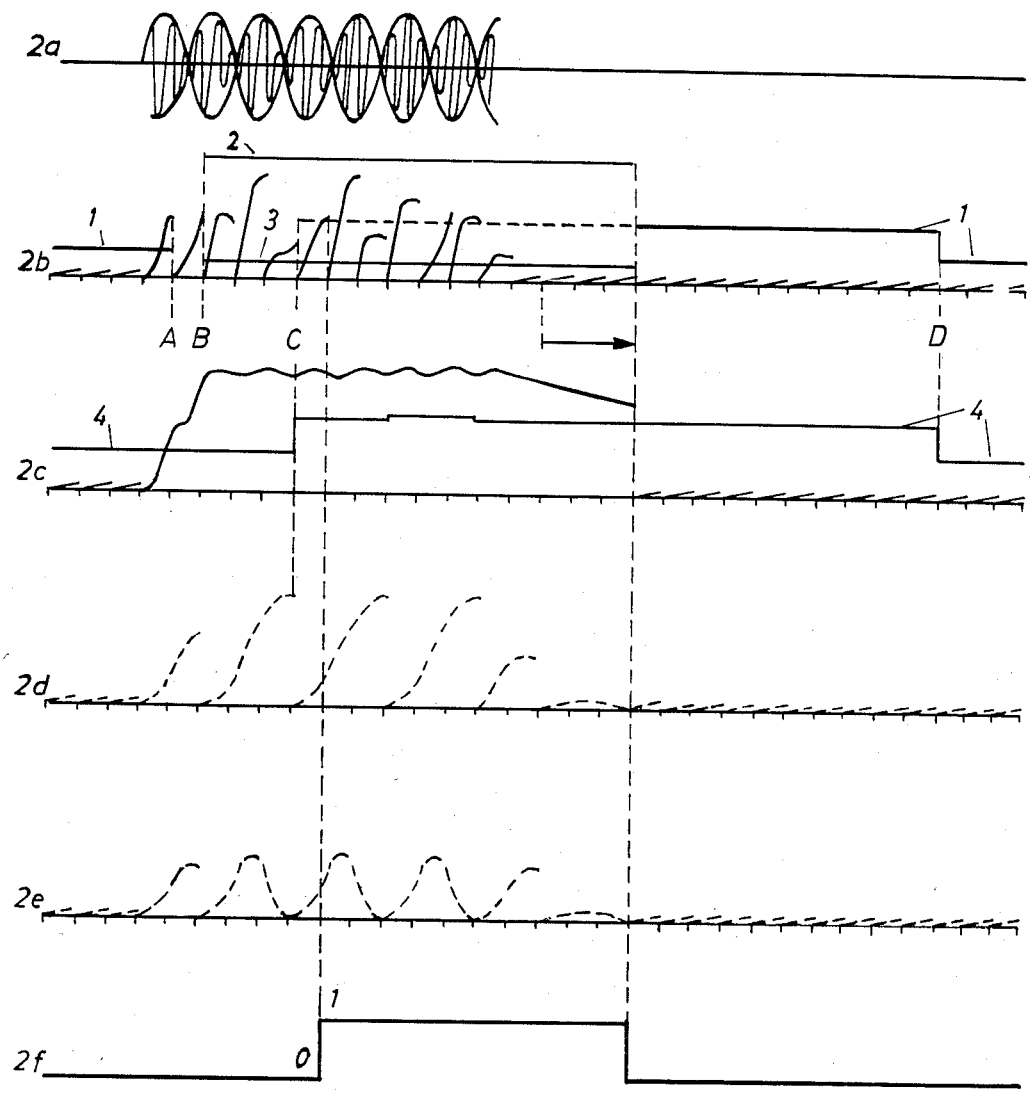
FIGS. 2a–2f illustrate the signal wave form in different parts of the receiver.

When the DFT is calculated during an entire 15 ms. interval (FIGS. 2b, 2c, B-C), the output signal from the non-selective receiver 18 is compared in the comparator 27 with a threshold (level 4) which, similar to level 1, is a signal depending, during a given limited time, on an accepted MFC signal. Thereafter, it assumes a fixed value again. If the signal falls below level 4, the receiver 18 returns to its resting state. If level 4 is exceeded, the sum of the selectively calculated energies is compared in the circuit 24 with a threshold which is proportional to the output signal squared in the circuit 25 and which comes from the non-selective receiver 18. FIG. 2d illustrates the output signal from a selective receiver for a frequency which is included in the input signal. It will be seen that signal processing begins at point B and the comparison takes place at point C. FIG. 2e illustrates the output signal from a selective receiver for a frequency which is not a part of the input signal.

If the energy within the passbands of the selective receivers is insufficient, the signal is recognized as being caused by some interference and not as an MFC signal. If the energy within the passbands is sufficient, the greatest of the measures of energy from the selective receivers is selected in selector 28 as a reference value, and in comparator 30 all selectively calculated measures of energy are compared with this value and also with a threshold value which is proportional to the greatest signal and which is formed in threshold 29. If no selectively calculated energy value exceeds the minimum value, the signal is recognized as a noise signal. An MFC frequency is recognized as being present if the selective receiver for this frequency has an energy measure exceeding the minimum value and lying within a given tolerance range under the reference value. The tolerance is set, in accordance with the CCITT R2 specification, more narrowly for a frequency which lies closer to the frequency with the greatest measure of energy, so that a false operation cannot be caused by a single tone signal. If one or more than two MFC frequencies are present, time monitoring is started which gives an alarm if incorrect combinations arise during the whole of the monitoring time. If two, and only two, frequencies are present, the two signal-responsive threshold levels 1 and 4 are updated, and after monitoring for a further 5 ms. (measured from point C) that the signal remains, the logical output decision (FIG. 2f) from the MFC receiver is given concerning the presence of a frequency included in the input signal simultaneously as possible time monitoring for alarm ceases (FIG. 2f).

The practical embodiment of the apparatus in accordance with the invention is based on known digital filter techniques. There is no difficulty for one skilled in the art to construct a multi-frequency receiver in accordance with the invention with guidance from the defined conditions, and accordingly a more detailed description of the filters or the remaining arithmetical and logical circuits is superfluous.

The individual operations of multiplication, addition and comparison can be executed with known components in a known manner. Accumulation can be executed by addition and storing the result in a memory. Time mesurement can be executed by accumulation and comparison. The arithmetical circuits will however be most efficiently utilized if all multiplications of signal by signal (squaring) are carried out in one and the same multiplier, which is utilized in time multiplex. Similarly, all additions and comparisons may be executed in one and the same arithmetical circuit, irrespective of where the operation is carried out in the block diagram. Accumulation of the products of multiplication in the selective receivers and of variables for time measurement, storage of sampling values in the non-selective receivers as well as storage of variable thresholds and state variables for the operation and release circuits may be carried out in a common write-and-read memory RWM, while the coefficients in both the selective and the non-selective receivers as well as the coefficients for calculating the threshold values may all be stored in a common read memory PROM. The structure for the most suitable circuit solution for an embodiment will be different, depending on whether merely one arrangement or several arrangements in time multiplex are intended to be realized. The control of the multiplex-utilized multiplier and adder as well as the read operations in the PROM and the write and read operations in the RWM may be obtained from a program memory which is addressed by a counter, while the generation of new values for the state variables can be carried out by combinatorial logical circuits of by using microprocessors.

The embodiment according to the described example refers to an apparatus for identifying signals according to the CCITT specification for a receiver adapted to the register signalling system R2. However, the apparatus defined in the patent claims may also be implemented for other frequency systems.

What is claimed is:

1. Apparatus for identifying incoming digital multi-frequency signals possibly inclusive of noise signals; said apparatus comprising a digital bandpass filter and a plurality of selective receivers coupled to said filter, said filter receiving said signals and the received signals being processed as input signals in said plurality of selective receivers, said selective receivers answering to received discrete frequencies, said selective receivers including means by which first the signal by each of said receivers is multiplied at sampling times by a coefficient from each of first and second sets of coefficients, the first set being the product of a sine function and a weighting function and the second set being the product of said sine function phase-shifted $\pi/2$ and said weighting function; the selective receivers including second means by which the multiplication products of the input signal and said coefficients are individually squared and the thusly squared results summed so that there is obtained a measure of signal energy within the passband, said apparatus further including first and second non-selective receivers coupled to said filter and in which the received signals are subjected to an absolute amount generation and digital lowpass filtering; the first receiver being responsive to changes in a thusly resulting composite input signal level, said first receiver in response to these changes controlling the start of calculation periods for the selective receivers and being zero-set after time periods of a length which is relatively small in relation to the lengths of the incoming signals and noise signals and of a length relatively large in relation to the longest time sequence of envelopes of the input signals, the second receiver generating a signal which is a measure of envelope amplitude; summing means coupled to said selective receivers for forming a sum signal from the signals generated by all of said selective receivers; squaring means for receiving and squaring an output signal received from said second non-selective receiver, a comparison means for comparing the sum signal with the signal obtained by squaring the output signal from the second non-selective receiver in response to said output signal being less than a determinable threshold and also in response to the circumstance that the signal from the first non-selective receiver does not increase or decrease beyond established sampling values; logical circuit means coupled to said comparison means for selecting, if comparison establishes that the sum signal is greater, the greatest of the selective receivers' output signals; threshold circuit means for forming a threshold value proportional to said greatest signal; and comparison circuit means coupled to said threshold circuit means, to said logical circuit means and to said selective receivers for determing in relation to a threshold value that a digital multi-frequency signal has been received.

2. Apparatus as claimed in claim 1 further comprising a logic circuit means coupled to said first non-selective receiver such that a signal is generated by said, logic circuit means in response to whether the output signal from the first non-selective receiver is relatively small in relation to sampling values during a sufficiently long sequence of time periods, and further means whereby following said sequence comparison takes place against a threshold before the first non-selective receiver is zero-set, said logic circuit means indicating that a multi-frequency signal has ceased.

3. An apparatus for identifying digital multi-frequency signals, said apparatus comprising a digital bandpass filter to receive the signals and a plurality of selective receivers, the signals received by said filter being processed in said selective receivers after passing through said digital bandpass filter, said selective receivers including means whereby the input signals forwarded by said filter to the selective receivers are multiplied at sampling times by a coefficient from each of first and second sets of coefficients, the first set being obtained by multiplying a sine function by a weighting function and the second set by multiplying the same sine function phase-shifted $\pi/2$ by the same weighting function, said selective receivers further including means whereby the products of the multiplications are formed and squared individually for each one of the multiplications, and the squared results are summed to obtain a measure of the signal energy within the passband, first and second non-selective receivers whereby the signals received by said filter are subjected to an absolute amount generation and digital filtering in said first and second non-selective receivers, the first non-selective receiver being responsive to changes in the composite input signal level and controlling the start of calculation periods in the selective receivers, and the second non-selective receiver generating a signal which is a measure of said envelope amplitude, a circuit means forming a sum signal from all said selective receivers, a comparison circuit means comparing the sum signal with a signal obtained by squaring the output signal from the second non-selective receiver, a logical circuit means selecting the greatest of the selective receivers' signals, a threshold circuit forming a threshold value which is proportional to said greatest signal, and a further comparison circuit means determining which of the remaining signals is greater than a determined value for indicating, together with the greatest signal, that a digital multifrequency signal has been received.

* * * * *